US011565497B2

(12) United States Patent
Haro et al.

(10) Patent No.: US 11,565,497 B2
(45) Date of Patent: Jan. 31, 2023

(54) PREPREG, LAMINATE BODY, FIBER-REINFORCED COMPOSITE MATERIAL, AND MANUFACTURING METHOD FOR FIBER-REINFORCED COMPOSITE MATERIAL

(71) Applicant: Toray Industries, Inc., Tokyo (JP)

(72) Inventors: Alfred P. Haro, Tacoma, WA (US); Nobuyuki Arai, Tacoma, WA (US); Andrew Hideo Koyanagi, Tacoma, WA (US)

(73) Assignee: TORAY INDUSTRIES, INC., Tokyo (JP)

( * ) Notice: Subject to any disclaimer, the term of this patent is extended or adjusted under 35 U.S.C. 154(b) by 56 days.

(21) Appl. No.: 16/971,376

(22) PCT Filed: Mar. 26, 2019

(86) PCT No.: PCT/IB2019/000461
§ 371 (c)(1),
(2) Date: Aug. 20, 2020

(87) PCT Pub. No.: WO2019/186281
PCT Pub. Date: Oct. 3, 2019

(65) Prior Publication Data
US 2021/0024712 A1 Jan. 28, 2021

Related U.S. Application Data

(60) Provisional application No. 62/814,518, filed on Mar. 6, 2019, provisional application No. 62/650,593, filed on Mar. 30, 2018.

(51) Int. Cl.
*B32B 5/16* (2006.01)
*B32B 5/02* (2006.01)
(Continued)

(52) U.S. Cl.
CPC ............... *B32B 5/16* (2013.01); *B32B 5/024* (2013.01); *B32B 27/12* (2013.01); *B32B 27/18* (2013.01);
(Continued)

(58) Field of Classification Search
CPC ..... B32B 2305/08; B32B 27/12; B32B 5/024; B32B 5/16; B32B 2305/076
See application file for complete search history.

(56) References Cited

U.S. PATENT DOCUMENTS

| 4,957,801 A * | 9/1990 | Maranci | B29C 70/086 428/327 |
| 2011/0017867 A1 * | 1/2011 | Simmons | B32B 27/26 428/300.1 |

(Continued)

FOREIGN PATENT DOCUMENTS

| JP | H01104624 A | 4/1989 |
| JP | H0232843 A | 2/1990 |

(Continued)

OTHER PUBLICATIONS

International Search Report and Written Opinion for International Application No. PCT/IB2019/000461, dated Oct. 1, 2019, 7 pages.
International Preliminary Report on Patentability and Written Opinion for International Application No. PCT/IB2019/000461, dated Oct. 6, 2020, 6 pages.

*Primary Examiner* — Alicia J Sawdon
(74) *Attorney, Agent, or Firm* — RatnerPrestia (57) ABSTRACT

A laminate body is provided which contains a thin prepreg having a component (A) containing a matrix of reinforcing fiber, a component (B) containing a thermosetting resin, and a component (C) containing particles of a thermoplastic resin. When molded and cured out of autoclave, the laminate body achieves a fiber-reinforced composite having a low void ratio and providing excellent mechanical performance.

16 Claims, 2 Drawing Sheets

Explanation of reference
1. Reinforcing fiber
2. Thermosetting resin
3. Thermoplastic resin particle X. Inter-layer molded layer (inter-layer thickness)
Y. Reinforcing fiber layer (intra-layer thickness)

(51) Int. Cl.
*B32B 27/12* (2006.01)
*B32B 27/18* (2006.01)
*B32B 27/38* (2006.01)
*C08J 5/04* (2006.01)
*C08J 5/24* (2006.01)

(52) U.S. Cl.
CPC ............... *B32B 27/38* (2013.01); *C08J 5/042* (2013.01); *C08J 5/243* (2021.05); *C08J 5/249* (2021.05); *B32B 2264/0221* (2013.01); *B32B 2305/076* (2013.01); *B32B 2305/08* (2013.01); *B32B 2305/188* (2013.01); *B32B 2305/72* (2013.01); *C08J 2363/00* (2013.01); *C08J 2481/06* (2013.01)

(56) References Cited

U.S. PATENT DOCUMENTS

| | | | |
|---|---|---|---|
| 2011/0218272 A1* | 9/2011 | Numata | C08J 5/24 524/514 |
| 2013/0122241 A1 | 5/2013 | Wadahara et al. | |
| 2016/0159054 A1* | 6/2016 | Lee | B32B 27/304 428/335 |

FOREIGN PATENT DOCUMENTS

| | | | |
|---|---|---|---|
| JP | H0269566 | A | 3/1990 |
| JP | H04292634 | A | 10/1992 |
| JP | 200888276 | A | 4/2008 |
| JP | 2010095557 | A | 4/2010 |
| WO | 94016003 | A1 | 7/1994 |
| WO | 2017103669 | A1 | 6/2017 |

* cited by examiner

FIG. 1

Explanation of reference
 1. Reinforcing fiber
 2. Thermosetting resin
 3. Thermoplastic resin particle

X. Inter-layer molded layer (inter-layer thickness)
 Y. Reinforcing fiber layer (intra-layer thickness)

FIG. 2

Explanation of reference
1 : Reinforcing fiber
2 : Thermosetting resin
3 : Reinforcing fiber layer (Intralayer)
4 : Thermoplastic resin particle
5 : Interlayer molded layer (Interlayer)
6 : Unimpregnated layer

FIG. 3

PREPREG, LAMINATE BODY, FIBER-REINFORCED COMPOSITE MATERIAL, AND MANUFACTURING METHOD FOR FIBER-REINFORCED COMPOSITE MATERIAL

CROSS-REFERENCE TO RELATED APPLICATIONS

This is the U.S. National Phase application of PCT/IB2019/000461, filed Mar. 26, 2019 which claims priority to U.S. Provisional Application No. 62/650,593, filed Mar. 30, 2018, and U.S. Provisional Application No. 62/814,518, filed Mar. 6, 2019. The disclosures of each of these applications are incorporated herein by reference in their entirety for all purposes.

FIELD OF THE INVENTION

The present invention relates to prepreg sheets capable of providing prepreg stacks (laminate bodies) that have a high degree of processability as well as cured fiber-reinforced composite materials prepared from such prepreg stacks having very low void content and excellent impact resistance, wherein the prepregs are well suited for use in manufacturing large complex structures and are compatible with automated layup machinery. The prepreg stacks can be molded using only a vacuum pump and oven in an out-of-autoclave process. The present invention also pertains to fiber-reinforced composite materials prepared using such prepreg sheets and prepreg stacks, as well as to manufacturing methods which employ the prepreg sheets and prepreg stacks.

BACKGROUND OF THE INVENTION

Fiber-reinforced composite materials are widely used in industry, including aerospace and spacecraft components which require particularly excellent structural mechanical properties as well as heat resistance. Traditionally, one of the preferred molding methods utilizes an autoclave creating high compaction pressures to consolidate, for example, large and complex structures to achieve the absence of voids in the cured material, thereby producing a rigid, light weight, and robust composite. On the other hand, these autoclave methods have high operating and capital costs and can restrict the molding size possibly due to equipment capacity, thereby encouraging the development of alternative molding methods.

Molding methods such as Out-Of-Autoclave (OOA) processes have been developed which rely on vacuum only methods, which apply much lower compaction pressures. OOA processes have demonstrated potential capital cost reductions and permit expanded molding size, yet these processes have difficulty achieving consistent void-free composites when venturing into large and complex structures, due to the lack of high compaction pressures such as those used in an autoclave. Additionally, OOA processing is suitable for fiber-reinforced composite components manufactured using fibers that are pre-impregnated with a matrix resin, also known as prepregs. To form a composite part from the prepregs (for instance in large and complex structures), one or more layers of prepregs are assembled within a mold by hand layup or with improved manufacturing efficiencies such as Automated Tape Placement and/or Automated Fiber Placement. Heat is applied to the assembly of prepregs to cause the matrix resin to flow, enabling consolidation of the prepreg layers to produce the final composite.

Current approaches to Out-Of-Autoclave processes utilize semi-impregnated prepreg sheets assembled into prepreg stacks comprised of a plurality of prepreg sheets suitable for manual layup. Such semi-impregnated prepreg sheets are characterized by having a dry (non-impregnated) fiber region in the center (core) section of the prepreg sheet, which allows air, moisture and other volatiles present within the prepreg sheet to be withdrawn from the prepreg sheet during curing. If permitted to be retained in the prepreg sheets, such volatiles lead to the production of voids in the cured fiber-reinforced composite material formed from a stack of such prepreg sheets. The presence of voids in cured fiber-reinforced composite materials is undesirable, as such defects usually detrimentally affect the physical and mechanical properties of these materials. However, during automated processes semi-impregnation may generate dry fiber balls (i.e., clusters of dry fibers) which can be deposited on the surface of the laminate resulting in defects as seen with industry standard OOA prepregs. On the other hand, semi-impregnated thin ply prepregs could be advantageous during automated processes as fuzz generation could be minimal due to its thinness and/or bulk factor.

Thin ply prepregs having a low fiber areal weight (<100 gsm compared to an industry standard weight >150 gsm) may be desired to further promote weight reduction, laminate strength improvement, and final composite thickness control. However, controlling the impregnation level for thin ply prepregs suitable for OOA processing having a dry (unimpregnated) fiber region in the center could be very difficult. Thin ply prepregs could possibly be designed to have an air path by controlling the impregnation similar to standard prepregs suitable for OOA processing. Thin ply prepregs may contain one or more discontinuous and/or continuous air paths which can provide the in-plane permeability necessary to mitigate volatiles and entrapped air during OOA processing, yet are still compatible with automated processes.

However, it would be desirable to develop a thin ply prepreg promoting further weight reduction suitable for OOA processing and having excellent mechanical performance and compatibility with automated processes.

SUMMARY OF THE INVENTION

Since OOA processes rely on voids being removed by vacuum only, prepregs are typically engineered having partial impregnation of a fiber layer by a resin to facilitate the removal of voids from the prepreg stack during consolidation in an OOA process. In particular, thin ply prepregs could also possess an air path within the fiber region of the prepreg for the purpose of promoting in-plane permeability, thereby providing one or more pathways generally in the plane of the prepreg stack through which gases or volatiles can escape during curing. The present inventors have discovered that a prepreg stack of thin ply prepregs (also referred to as a "laminate body") intended for use in an OOA molding process can provide sufficient in-plane permeability to achieve a void ratio after out of autoclave cure of <1%.

As a result of diligent research, the present inventors have discovered a prepreg that, when incorporated into a laminate body, provides a laminate body of high quality suitable for out-of-autoclave processing and automated process, having excellent mechanical performance and an exceptionally low void ratio when consolidated and cured.

In one embodiment, the invention provides a prepreg, comprised of:
- a component (A) comprising a matrix of reinforcing fiber;
- a component (B) comprising a thermosetting resin; and
- a component (C) comprising a plurality of particles of thermoplastic resin;

wherein:
i) the matrix of reinforcing fiber is impregnated by component (B);
ii) component (B) represents from about 36% to about 48% of the total weight of the prepreg; and
iii) the prepreg, when laid up in multiple plies, provides a laminate body which after out of autoclave cure provides a fiber-reinforced composite material having a) an inter-laminar thickness and an intra-laminar thickness satisfying the ratio:
  $0.6 < 2X/Y < 1.0$, wherein X is the inter-laminar thickness and Y is the intra-laminar thickness, and b) a void ratio of <1%.

According to particularly preferred embodiments, the above-described prepreg contains a matrix of reinforcing fiber having a fiber areal weight of between about 10 gsm to about 100 gsm (i.e., the prepreg containing the matrix of reinforcing fiber has a fiber areal weight of about 10 gsm to about 100 gsm) and the laminate body before out of autoclave cure has an in-plane permeability which is lower than $3.0E-14$ m$^2$.

As used herein, the term "inter-laminar thickness" means the thickness of an inter-laminar layer (sometimes referred to herein as an "inter-layer") in a fiber-reinforced composite material obtained by curing a laminate body made by laying up multiple plies of prepreg. An inter-laminar layer (inter-layer) is a layer between adjacent layers of reinforcing fiber in a fiber-reinforced composite material. In the context of the present invention, an inter-laminar layer is comprised of a cured matrix derived from component (B) in combination with component (C), but not containing any reinforcing fiber. Accordingly, inter-laminar thickness may be considered to be the distance between adjacent layers of reinforcing fiber in a fiber-reinforced composite material, when examined in cross-section.

As used herein, the term "intra-laminar thickness" means the thickness of an intra-laminar layer (sometimes referred to herein as an "intra-layer") in a fiber-reinforced composite material obtained by curing a laminate body made by laying up multiple plies of prepreg. An intra-laminar layer (intra-layer) is a layer of reinforcing fiber embedded in a cured resin matrix in a fiber-reinforced composite material. In the context of the present invention, an intra-laminar layer is comprised of a matrix of reinforcing fiber and a cured matrix derived from component (B). Accordingly, intra-laminar thickness may be considered to be the distance between the two "surfaces" of a layer of reinforcing fiber in a fiber-reinforced composite material, when examined in cross-section.

In reference to the first embodiment above, "out of autoclave cure" can mean a curing procedure as follows: A laminate body is fabricated by laying up 8 plies of prepreg in accordance with the present invention and molding the laminate body using a vacuum bag only process by placing it in a vacuum envelope and degassing for three hours at room temperature with a degree of vacuum of about 100 kPa. After degassing is complete, the laminate body is brought from room temperature to 120° C. at a rate of 1.7° C./min and held at 120° C. for 240 minutes and then finally cured at a rate of 1.7° C./min to 180° C. for 120 minutes to provide a fiber-reinforced composite material.

The inter-laminar thickness and intra-laminar thickness may be controlled and varied as desired by, for example, adjusting the resin matrix content of the prepreg (the weight amount of component (B)+component (C) relative to the total weight of the prepreg) and adjusting the fiber areal weight of the matrix of reinforcing fiber used in the prepreg.

Methods for measuring inter-laminar thickness and intra-laminar thickness are described in detail elsewhere herein.

In a second embodiment, the prepreg contains a matrix of reinforcing fiber having a fiber areal weight of between about 10 gsm to about 300 gsm or more preferably from about 10 gsm to about 100 gsm (i.e., the weight of the reinforcing fiber in grams per square meter of the prepreg is from about 10 to about 300 or, more preferably, from about 10 to about 100).

In a third embodiment, the laminate body (in an uncured state) has an in-plane permeability which is lower than $3.0E-14$ m$^2$.

In a fourth embodiment, the plurality of particles of thermoplastic resin has a particle size distribution as measured by a laser diffraction scattering method such that when a cumulative curve is determined with the total volume as 100%, a particle diameter of the particles having a cumulative curve of 90% is between about 5 µm and about 20 µm.

In a fifth embodiment, the particles of thermoplastic resin of component (C) are present in an amount of about 6 wt % to about 20 wt % based on the weight of the thermosetting resin.

In a sixth embodiment, components (B) and (C) when cured provide a cured resin matrix having a glass transition temperature above 150° C. (e.g., a Tg from about 180° C. to about 220° C.).

In a seventh embodiment, component (B) has a viscosity at 40° C. of between about 100 and about 10000 Pa·s and a minimum viscosity of between about 0.1 and about 15 Pa·s.

In an eighth embodiment, component (B) is additionally comprised of at least one thermoplastic resin dissolved in the thermosetting resin which is selected from the group consisting of polyvinyl formals, polyamides, polycarbonates, polyacetals, polyvinylacetals, polyphenyleneoxides, polyphenylenesulfides, polyarylates, polyesters, polyamideimides, polyimides, polyetherimides, polysulfones, polyethersulfones, polyetherketones, polyetheretherketones, polyaramids, polyethernitriles, polybenzimidazoles, derivatives thereof, and combinations thereof.

In a ninth embodiment, the thermoplastic resin dissolved in the thermosetting resin of component (B) is present in component (B) in an amount which is 5-30 weight parts per 100 weight parts of the thermosetting resin.

In a tenth embodiment, component (C) is substantially locally distributed on or near a surface of the prepreg.

In an eleventh embodiment, the prepreg comprises a first layer comprised of a portion of the thermosetting resin and a second layer comprised of the matrix of reinforcing fiber.

In a twelfth embodiment, the first layer is at or near a surface of the prepreg up to a depth of 20% from the surface.

In a thirteenth embodiment, both sides of the prepreg are covered substantially by component (B).

In a fourteenth embodiment, a laminate body is provided which is comprised of a plurality of prepregs in accordance with any of the above-mentioned embodiments.

In a fifteenth embodiment, a fiber-reinforced composite material is provided which is comprised of at least one laminate body in accordance with the above-mentioned fourteenth embodiment, wherein the laminate body has been thermally cured.

In a sixteenth embodiment, the matrix of reinforcing fiber in the fiber-reinforced composite material of the fifteenth embodiment is unidirectional or has a fabric weave structure.

In a seventeenth embodiment, the fiber-reinforced composite material of the fifteenth or sixteenth embodiment has a void ratio of <1%.

In an eighteenth embodiment, a method for manufacturing a fiber-reinforced composite material is provided, comprising molding the laminate body of the fourteenth embodiment using a vacuum pump and oven.

In a nineteenth embodiment, a process for making a prepreg is provided, comprising impregnating a component (A) comprising a matrix of reinforcing fiber with a component (B) comprising a thermosetting resin in combination with a component (C) comprising a plurality of particles of thermoplastic resin to form the prepreg, wherein:
  i) component (B) represents from about 36% to about 48% of the total weight of the prepreg; and
  ii) the prepreg, when laid up in multiple plies, provides a laminate body which after out of autoclave cure provides a fiber-reinforced composite material having a) an inter-laminar thickness and an intra-laminar thickness satisfying the ratio: $0.6<2X/Y<1.0$, wherein X is the inter-laminar thickness and Y is the intra-laminar thickness, and b) a void ratio <1%.

According to particularly preferred aspects of the above-mentioned nineteenth embodiment, the prepreg contains a matrix of reinforcing fiber having a fiber areal weight of between about 10 gsm to about 100 gsm and the laminate body before out of autoclave cure has an in-plane permeability which is lower than $3.0E-14 \text{ m}^2$.

In a twentieth embodiment, a process for making a fiber-reinforced composite material is provided which comprises the steps of:
  a) laying up a plurality of plies of a prepreg to obtain a laminate body; and
  b) curing the laminate body to obtain the fiber-reinforced composite material; wherein:
  i) the prepreg comprises a component (A) comprising a matrix of reinforcing fiber impregnated by about 36% to about 48% by weight based on the total weight of the prepreg of a component (B) comprising a thermosetting resin in combination with a component (C) comprising a plurality of particles of thermoplastic resin; and
  ii) the fiber-reinforced composite material has a) an inter-laminar thickness and an intra-laminar thickness satisfying the ratio: $0.6<2X/Y<1.0$, wherein X is the inter-laminar thickness and Y is the intra-laminar thickness, and b) a void ratio <1%.

According to particularly preferred aspects of the above-mentioned twentieth embodiment, the prepreg contains a matrix of reinforcing fiber having a fiber areal weight of between about 10 gsm to about 100 gsm and the laminate body before out of autoclave cure has an in-plane permeability which is lower than $3.0E-14 \text{ m}^2$.

In a twenty-first embodiment, a prepreg is provided which is comprised of:
  a component (A) comprising a matrix of reinforcing fiber;
  a component (B) comprising a thermosetting resin; and
  a component (C) comprising a plurality of particles of thermoplastic resin;
  wherein:
  i) the matrix of reinforcing fiber is impregnated by component (B);
  ii) component (B) represents from about 36% to about 48% of the total weight of the prepreg; and
  iii) the prepreg, when laid up in multiple plies, provides a laminate body which after out of autoclave cure provides a fiber-reinforced composite material having an inter-laminar thickness and an intra-laminar thickness satisfying the ratio:
    $0.6<2X/Y<1.0$, wherein X is the inter-laminar thickness and Y is the intra-laminar thickness.

According to particularly preferred aspects of the above-mentioned twenty-first embodiment, the prepreg contains a matrix of reinforcing fiber having a fiber areal weight of between about 10 gsm to about 100 gsm and the laminate body before out of autoclave cure has an in-plane permeability which is lower than $3.0E-14 \text{ m}^2$.

DETAILED DESCRIPTION OF EMBODIMENTS OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The terms "approximately" and "about" as used herein represent an amount close to the stated amount that still performs the desired function or achieves the desired result. The term "room temperature" as used herein means 23° C., unless the context indicates otherwise.

Herein, "prepreg" refers to a molding intermediate substrate where a matrix (e.g., a layer) of reinforcing fiber is impregnated with a matrix resin. In the present invention, a thermosetting resin composition containing (B) thermosetting resin and, optionally, (C) particles (which may be in particulate or fiber form) of thermoplastic resin is used as the matrix resin. Other components may also be present in the thermosetting resin composition including, for example, one or more hardeners. The thermosetting resin is in an uncured condition in the prepreg, and a fiber-reinforced composite material can be obtained by laying up the prepreg (stacking up multiple layers of prepreg to form a laminate body) and curing. Naturally, a fiber-reinforced composite material can be obtained by curing a single layer of prepreg. When a fiber-reinforced composite material is made by laying up a plurality of prepreg layers and curing the resulting laminate body, the surface part of the prepreg layers becomes an inter-layer molded layer containing (B) and optionally also component (C), formed on the layer of the reinforcing fibers which is preferably up to a depth of about 20% from the surface of the reinforcing fiber layer, and the inside (interior) of the prepreg becomes a reinforcing fiber layer of the fiber-reinforced composite material. Furthermore, in one embodiment of the invention, only one side of the prepreg (which is typically in the form of a sheet, having a first side and a second side and an average thickness) is covered substantially by the thermosetting resin composition component (B), which optionally is combined with component (C). However, in other embodiments, both sides of the prepreg are covered substantially by the thermosetting resin composition component (B), which is optionally combined with component (C).

In certain embodiments of the invention, the prepreg is in the form of a sheet having a thickness of 0.001 inches to 0.008 inches (0.02 mm to 0.20 mm; 1 to 8 mils). A laminate body containing plies of prepreg in accordance with the present invention may contain two or more prepreg plies, for example 2-30 plies or 4 to 20 plies.

The term "permeability" as used herein means the permeability parameter as measured by the method described in the Examples.

Figure 1:
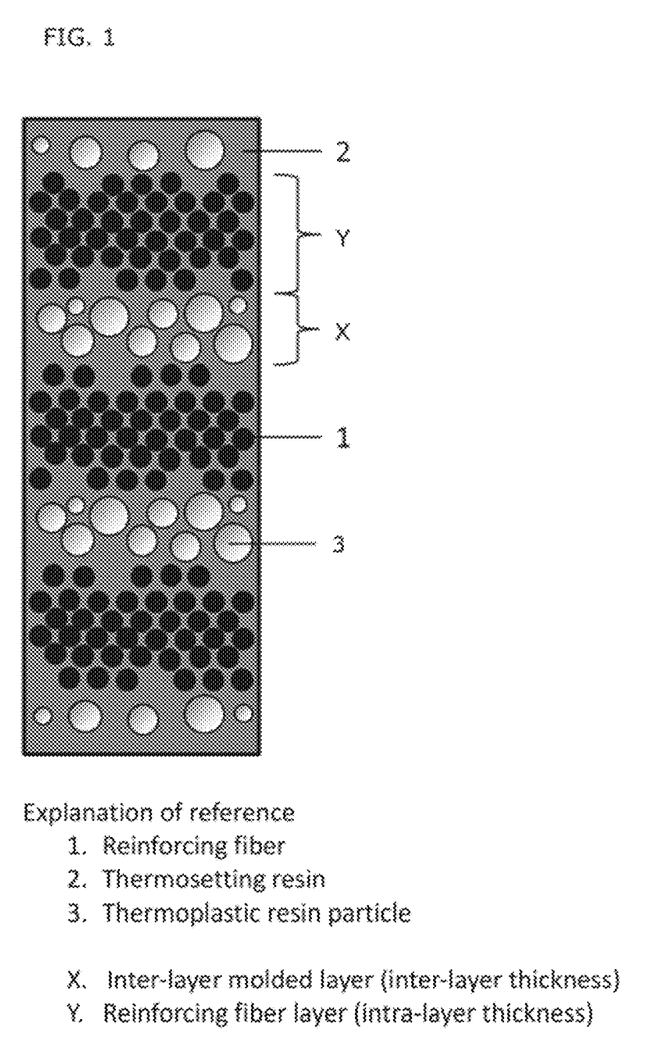
FIG. 1 shows a cross-sectional view of an example of a laminate body of the present invention comprised of three prepregs.

FIG. 1 shows an example of a cross-sectional view of a typical cured laminate body (i.e., a fiber-reinforced composite material) as may be fabricated using prepreg in accordance with the present invention. In particular, FIG. 1 shows, in cross section, an example of a laminate body after cure, consisting of (prior to being consolidated and cured) three layers (plies) of prepreg. Component (A) comprises reinforcing fibers (1) and Component (B) comprises thermosetting resin composition (2). The reinforcing fiber layer or intra-laminar layer (Y) is comprised of Component (A). The inter-laminar layer (X) comprising Component (C), containing thermoplastic resin particles (3), is positioned between the layers of reinforcing fiber. The intra-laminar thickness (Y) corresponds to the thickness of the fiber region of Component (A) and the corresponding inter-laminar thickness (X) corresponds to the thickness of the layer comprising Components (B) and (C). While permeability is still sufficient, if the ratio of 2(X) (X=the inter-laminar thickness) to (Y) (=the intra-laminar thickness) is too low it may lead to insufficient resin content to fill in the fiber bed and intra-layer, resulting in a high void content and compromising mechanical performance. If the ratio is too high, a low void content may be achieved but the fiber volume fraction may be too low to achieve optimal mechanical performance and may add undesired weight to the laminate.

Figure 2:
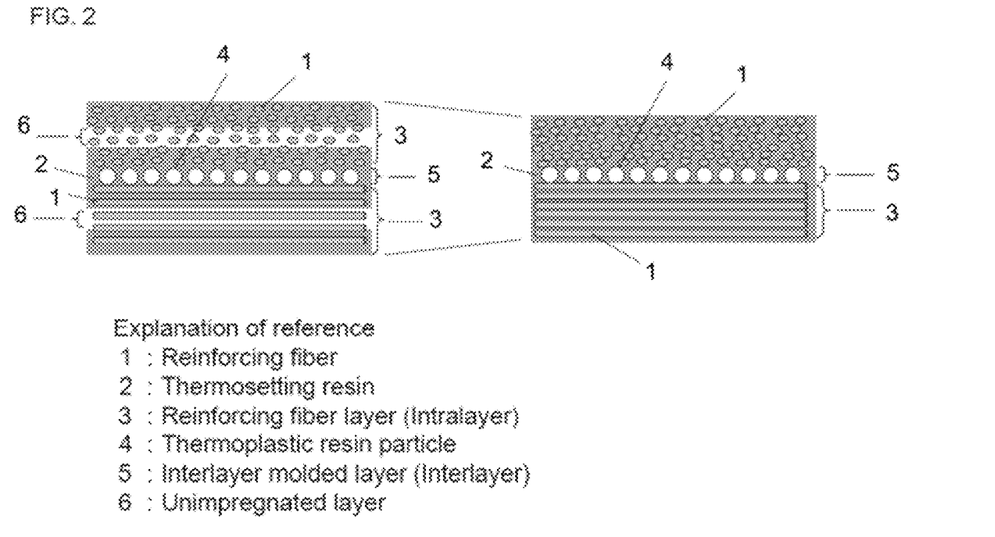
FIG. 2 is a schematic of an embodiment of a consolidation process for an exemplary laminate body in accordance with the present invention, showing the exemplary laminate body before and after cure.

The consolidation process for two plies of partially impregnated prepreg in accordance with one embodiment of the present invention may be described by reference to FIG. 2. FIG. 2 is a schematic of the consolidation process for two plies of prepreg (together comprising a permeable laminate body), showing (on the left side of FIG. 2) the laminate body before cure (when it is permeable) and (on the right side of FIG. 2) after cure (when it has been converted to a fiber-reinforced composite material having a favorably low void ratio). The laminate body on the left side of FIG. 2 shows a similar configuration to the laminate body of FIG. 1 before cure (except that the laminate body of FIG. 2 contains only two plies of prepreg, rather than three plies as in the laminate body used to produce the fiber-reinforced composite material of FIG. 1). After cure (as illustrated on the right side of FIG. 2), the reinforcing fiber layer or intra-layer (3) is completely formed within the cured laminate body and the inter-layer molded layer (5) is further distinguishable between two layers in the cured laminate body. Additionally, unimpregnated layers (6) have been eliminated as a result of the further penetration of thermosetting resin composition (2) into the reinforcing fiber layers (3). Unimpregnated layers (6) function as gas permeable pathways through the laminate body, thereby facilitating the escape of gases and volatiles within the laminate body that might otherwise become entrapped in the laminate body during curing of the thermosetting resin composition (2), thereby creating undesirable voids in the resulting fiber-reinforced composite material made from the laminate body.

During curing of the prepreg plies in the laminate body, the thermosetting resin composition (2) impregnates the unimpregnated layer (6). At the same time, the density of the prepreg is increased as a result of the air space within the unimpregnated layer (6) being replaced by thermosetting resin composition (2). The portions of thermosetting resin composition which had been separated from each other on either side of the unimpregnated layer may be regarded as becoming integrated with each other during curing so as to form a continuous resin matrix in the fiber-reinforced composite material thereby obtained. In the present invention, this series of processes is defined as the consolidation process. In order to achieve low voids in the fiber-reinforced composite material obtained, the aforementioned consolidation process is completed during curing of the prepreg. Furthermore, as one step of the consolidation process, air that is trapped during layup and volatile components from the prepreg are released out of the prepreg during the consolidation process. With the prepreg of the present invention, the weight fraction of the thermosetting resin in the inter-layer molded layer (5) is selected by controlling the resin impregnation to a high degree, and by controlling the flow of the matrix resin during prepreg curing. Particularly, the flow of the matrix resin in the inter-layer molded layer (5) may be maximized, even in low pressure conditions, such as without autoclave molding. Furthermore, air that is trapped during layup and volatile components from the prepreg are released out of the prepreg using the flow of the matrix resin while at the same time the unimpregnated layer (6) inside the prepreg can be quickly impregnated with matrix resin, and the prepreg consolidation process can be completed. Furthermore, the fiber-reinforced composite material obtained can simultaneously have a low void ratio and high impact resistance.

Epoxy resins (in particular, epoxy resins which are solid at room temperature, 23° C.) can be used in the thermosetting resin composition constituting component (B) of the present invention, provided they do not interfere with the ability to achieve partially impregnated prepregs having the desired characteristics (e.g., prepregs which can be laid up into laminate bodies having satisfactory permeability, even after the prepregs have experienced long out times, and which may be cured to provide fiber-reinforced composite materials having <1% void ratios). For example, liquid and semi-solid epoxy resins (epoxy resins which are liquid or semi-solid at room temperature) may be utilized, in combination with the aforementioned solid epoxy resins, provided their content in component (B) is not so high as to compromise the permeability of the laminate body to an unacceptable extent. The liquid and semi-solid epoxy resins may be, for instance, liquid and semi-solid bisphenol A epoxy resins, liquid and semi-solid bisphenol F epoxy resins, liquid and semi-solid glycidyl amine based epoxy resins (e.g., Araldite® MY9655, sold by Huntsman Advanced Materials, which is a tetraglycidyldiaminodiphenylmethane), and the like. Thermosetting resins other than epoxy resins may also be employed.

Most preferably, component (B) contains, in addition to thermosetting resin, at least one thermoplastic resin blended into and dissolved in the thermosetting resin, in order to provide improved effects such as enhancing the toughness of the matrix resin when cured and at the same time controlling the viscosity of the resin to improve prepreg permeability during prolonged out-time and storage conditions. Furthermore, the thermoplastic resin can be crystalline or amorphous. In particular, at least one type of thermoplastic resin is used which is selected from the group consisting of polyamides, polycarbonates, polyacetals, polyphenylene oxides, polyphenylene sulfides, polyarylates, polyesters, polyamideimides, polyimides, polyetherimides, polyimides with a phenyltrimethylindane structure, polysulfones, polyethersulfones, polyetherketones, polyetheretherketones, polyaramids, polyethernitriles, and polybenzimidazoles. These thermoplastic resins can be commercial polymers, or so-called oligomers with a lower molecular weight than commercial polymers.

A thermoplastic resin having a number average molecular weight of 10,000 to 70,000 g/mol is preferably used and most preferably a thermoplastic resin having a number average molecular weight of 20,000 to 60,000 g/mol is used. If the thermoplastic resin has an excessively low number average molecular weight, a prepreg may have excessive tack property thus compromising the handling properties of the prepreg. Furthermore, resin flow could be too high, which may collapse the permeable pathway(s) in the partially impregnated prepreg. If a thermoplastic resin having an excessively high number average molecular weight is used, a prepreg may lose its tack property all together and thus handling properties are worsened or the prepreg may fail to be produced due to the viscosity of the resin being too high when the thermoplastic resin is dissolved in the thermosetting resin. Above all, when a thermoplastic resin having a number average molecular weight within the preferred range is used and dissolved in a thermosetting resin, a large amount of the thermoplastic resin can be incorporated as long as the prepreg process is not compromised. As a result, good resin flow, high toughness, and high tensile strength can be achieved in the cured fiber-reinforced composite material obtained.

Furthermore, the formulation amount of these thermoplastic resins in component (B) is preferably between 5 and 30 weight parts, more preferably between 10 and 25 weight parts, and most preferably between 10 and 23 weight parts, per 100 weight parts of thermosetting resin (e.g., epoxy resin). If the formulation amount of thermoplastic resin is too low, there is a possibility that toughness could be lost and, more importantly, that the permeability of the laminate body could be compromised by not having sufficient viscosity levels to maintain the air paths needed for long out time OOA processes. If the formulation amount of the thermoplastic resin is too high, toughness could be improved although processability could potentially be lost due to the significant increase in resin viscosity causing extreme processing conditions.

The viscosity at 40° C. of the thermosetting resin composition (component (B)) of the present invention is preferably between about 100 and about 10000 Pa·s and most preferably between about 200 and about 8000 Pa·s. If the viscosity at 40° C. is too low, there is a possibility resin flow could prematurely close off the air paths within the prepregs, causing high void content in the fiber-reinforced composite material obtained; this would reduce the out time capability of the prepreg. If the viscosity at 40° C. is too high, improved permeability could be achieved, although resin flow may be restricted during cure and interfere with the consolidation process, thereby leading to high void content.

The minimum viscosity of the thermosetting resin composition (component (B)) of the present invention is measured in accordance with the procedure described in the Examples and is preferably between 0.1 and 15 Pa·s, more preferably between 0.3 and 10 Pa·s, and most preferably between 0.5 and 10 Pa·s. If the minimum viscosity is too low, the flow of the matrix resin could be too high causing the resin to bleed out of the laminate body during the cure process. Furthermore, there is a possibility that the desired resin fraction might not be achieved for the fiber-reinforced composite material obtained, the flow of the matrix resin in the prepreg will be insufficient, and an undesirably high content of voids would be present in the fiber-reinforced composite material obtained. If the minimum viscosity is too high, there is a possibility that the flow of the matrix resin in the prepreg will be low, causing the consolidation process of the laminate body to end early; this is likely to lead to a high void content in the fiber-reinforced composite material obtained (compromising the mechanical properties of the composite material).

For the present invention, if excellent impact resistance in the cured fiber-reinforced composite material is desired, particles or fibers (collectively referred to herein simply as "particles") of thermoplastic resin may be included as a component ("component (C)") of the prepreg in addition to component (B) (the thermosetting resin composition) and component (A) (the matrix of reinforcing fiber). The types of material that are used for the component (C) particles or fibers of thermoplastic resin in the present invention can be similar to the various types of thermoplastic resins previously described as the thermoplastic resin that may be blended and dissolved in the thermosetting resin composition. Of these, polyamides are most preferable for greatly increasing the impact resistance due to their excellent toughness. Among the polyamides, nylon 12, nylon 11, nylon 6, nylon 6/12 copolymer, and a nylon (semi-IPN nylon) modified to have a semi-IPN (interpenetrating polymer network) with an epoxy compound as disclosed in Example 1 of Japanese Patent Application Laid-open No. 1-104624 impart particularly good adhesive strength in combination with the epoxy resin, and nylon 6/12 copolymers impart particularly favorable adhesion strength to the (B) thermosetting resin composition. Furthermore, the weight of the (C) particles or fibers of thermoplastic resin is preferably 20 weight % or less with regards to the total weight of the prepreg and/or is preferably 1 weight % or more with regards to the total weight of the prepreg.

With the prepreg of the present invention, the component (C) particles and/or fibers of thermoplastic resin are preferably locally provided on the surface part of the prepreg. In other words, a layer with an abundance of the aforementioned particles and/or fibers may be present on at least one surface of the prepreg, where the particles and/or fibers of component (C) can clearly be identified to exist locally when the prepreg is observed in cross section. This layer is hereinafter also referred to as an inter-layer molding layer, as it is present between adjacent layers of prepreg in the laminate body and in the fiber-reinforced composite material obtained by curing and molding the laminate body. Thereby, if the prepreg is overlaid and the matrix resin is cured to form a fiber-reinforced composite material an inter-layer is formed where the aforementioned particles and/or fibers of component (C) exist locally between the reinforcing fiber layers. This feature serves to increase the toughness between the reinforcing fiber layers, and the fiber-reinforced composite material obtained will have a high degree of impact resistance.

Furthermore, the presence of particles or fibers of the thermoplastic resin ("component (C)") could increase the resin viscosity when incorporated in the thermosetting resin composition (Component (B)). When the viscosity increases due to the addition of the particles, the thermosetting resin can potentially be retained more effectively towards the surface of the prepreg, thereby preventing the air pathways from closing prematurely. The weight of the (C) particles or fibers of thermoplastic resin is preferably between about 6 weight % to about 20 weight % with regards to the weight of thermosetting resin. Moreover, when the thermosetting resin has an initial viscosity 20000 Pa·s, it is more preferred to employ a particle content >6 wt % and a particle content of <20 wt % to maintain resin on the surface of the prepreg, preventing the air pathways from closing off prematurely. If the formulation amount of thermoplastic particles is too low, there is a possibility that the air pathways could close and toughness could be lost. If the formulation amount of the thermoplastic particles is too high, toughness could be improved; however, processability could potentially be lost due to the significant increase in resin viscosity, causing extreme processing conditions.

The thermosetting resin composition (Component (B)) may and preferably does contain one or more hardeners capable of curing the thermosetting resin. The hardener for the epoxy resin can be any compound with an active group that can react with an epoxy group. Compounds with at least one amino group, acid anhydride group, or azide group are suitable as hardeners, for example. More specific examples of hardeners include various isomers of diamino diphenyl sulfone, amino benzoate esters, various types of acid anhydrides, phenol novolac resins, cresol novolac resins, polyphenol compounds, imidazole derivatives, aliphatic amines, tetramethyl guanidine, thiourea adduct amines, methylhexahydrophthalic anhydride, and other carboxylic acid anhydrides, carboxylic acid hydrazides, carboxylic acid amides, polymercaptans, and boron trifluoride ethylamine complexes, and other Lewis acid complexes and the like. These hardeners can be used individually or in combination.

By using an aromatic diamine as the hardener, a cured resin with favorable heat resistance can be obtained. In particular, various isomers of diamino diphenyl sulfone provide a cured resin with favorable heat resistance, and therefore are most suitable. The amount of aromatic diamine hardener that is added is preferably a stoichiometric equivalent amount (relative to the epoxy content of the epoxy resin) but in some cases, a cured resin with high modulus of elasticity can be obtained by using an equivalent ratio (hardener:epoxy) of approximately 0.7 to 1.0.

The resin content (i.e., the amount of the thermosetting resin composition (component (B)) in the prepreg of the present invention is between about 36% and about 48%, more preferably between 38% and 46%, and most preferably between 38% and 42%. That is, component (B) represents from about 36% to about 48%, more preferably between 38% and 46%, and most preferably between 38% and 42% of the total weight of the prepreg. If the resin content is too low, poor impregnation could occur due to insufficient resin causing a high number of voids in the fiber-reinforced composite material obtained using the prepreg. If the resin content is too high, voids may be reduced yet reduction in the volume fraction of the fiber may comprise mechanical performance and adding undesired weight to the prepreg.

The glass transition temperature of the cured matrix resin influences the heat resistance of the fiber-reinforced composite material. It is preferred that the cured product of the thermosetting resin composition of the present invention has a high glass transition temperature. Specifically, it is preferred that the glass transition temperature of the cured material obtained be >150° C. (e.g., about 180° C. to about 220° C.).

In the preparation of the thermosetting resin composition of the present invention, a kneader, planetary mixer, triple roll mill, twin screw extruder, and the like may advantageously be used. Where two or more epoxy resins are used, after the epoxy resins are placed in the equipment, the mixture is heated to a temperature in the range of from 60 to 160° C. while being stirred so as to uniformly dissolve the epoxy resins. During this process, other components, excluding the curing agent(s) (e.g., thermoplastic resin particles), may be added to the epoxy resins and kneaded with them. Thereafter, the mixture is cooled down to a temperature no more than 80° C. while being stirred, followed by the addition of the curing agent(s) and kneading to disperse those components.

Next, fiber-reinforced plastics (FRP) materials (alternatively referred to herein as "fiber-reinforced composite materials") are described. There are no specific limitations or restrictions on the type or types of reinforcing fiber used in the present invention, and a wide range of fibers, including glass fiber, carbon fiber, graphite fiber, aramid fiber, boron fiber, alumina fiber and silicon carbide fiber, may be used. Carbon fiber may provide FRP materials that are particularly lightweight and stiff. Carbon fibers with a tensile modulus of 180 to 800 GPa may be used, for example. If a carbon fiber with a high modulus of 180 to 800 GPa is combined with a thermosetting resin composition to provide a prepreg, a desirable balance of stiffness, strength and impact resistance may be achieved in the FRP material.

There are no specific limitations or restrictions on the form of reinforcing fiber, and fibers with diverse forms may be used, including, for instance, long fibers (drawn in one direction), tow, fabrics, mats, knits, braids, and short fibers (chopped into lengths of less than 10 mm). Here, long fibers mean single fibers or fiber bundles that are effectively continuous for at least 10 mm. Short fibers, on the other hand, are fiber bundles that have been chopped into lengths of less than 10 mm. Fiber configurations in which reinforcing fiber bundles have been aligned in the same direction may be suitable for applications where a high specific strength and specific modulus are required.

FRP materials of the present invention may be manufactured using methods such as the prepreg lamination and molding method, resin transfer molding method, resin film infusion method, hand lay-up method, sheet molding compound method, filament winding method and pultrusion method, though no specific limitations or restrictions apply in this respect. Of these methods, the prepreg lamination and molding method may be used to give excellent stiffness and strength to the FRP materials obtained.

Prepregs may contain embodiments of the thermosetting resin composition and reinforcing fibers. Such prepregs may be obtained by impregnating a reinforcing fiber base material with a thermosetting resin composition of the present invention. Impregnation methods include the wet method and hot melt method (dry method).

The wet method is a method in which reinforcing fibers are first immersed in a solution of a thermosetting resin composition, created by dissolving the thermosetting resin composition in a solvent, such as methyl ethyl ketone or methanol, and retrieved, followed by the removal of the solvent through evaporation via an oven, etc. to impregnate reinforcing fibers with the thermosetting resin composition. The hot-melt method may be implemented by impregnating reinforcing fibers directly with a thermosetting resin composition, made fluid by heating in advance, or by first coating a piece or pieces of release paper or the like with a thermosetting resin composition for use as resin film and then placing a film over one or either side of reinforcing fibers as configured into a flat shape, followed by the application of heat and pressure to impregnate the reinforcing fibers with the resin. The hot-melt method may give a prepreg having virtually no residual solvent in it.

The reinforcing fiber cross-sectional density (i.e., the FAW) of a prepreg may be about 10 g/m$^2$ to 300 g/m$^2$, but in especially preferred embodiments of the invention is from about 10 g/m$^2$ to about 100 g/m$^2$. If the reinforcing fiber volume fraction is at least 50%, this may provide the advantage of a FRP material in terms of its excellent specific strength and specific modulus, as well as preventing the FRP material from generating too much heat during the curing time. If the reinforcing fiber volume fraction is no more than 80%, impregnation with the resin may be satisfactory, decreasing a risk of a large number of voids forming in the FRP material.

The impregnation conditions may be selected and controlled such that the resulting prepreg contains one or more air paths (areas of unimpregnated reinforcing fiber), typically within the central region of the prepreg when viewed in cross section.

To apply heat and pressure under a prepreg lamination and molding method, a press molding method, autoclave molding method, vacuum bagging molding method, wrapping tape method, internal pressure molding method, or the like may be used as appropriate.

The reinforcing fibers that are used in the prepreg of the present invention can be glass fibers, aramid fibers, carbon fibers, graphite fibers, or boron fibers or the like, as mentioned previously. Of these, carbon fibers are preferable from the perspective of specific strength and specific modulus.

With the prepreg of the present invention, the amount of reinforcing fibers per unit area is preferably between 10 g/m$^2$ and 300 g/m$^2$, more preferably between 10 g/m$^2$ and 200 g/m$^2$, and most preferably between 10 g/m$^2$ and 100 g/m$^2$. If the amount of reinforcing fibers is high, composite thickness and drapability of the prepreg could be compromised in addition to weight penalty. If the amount of reinforcing fibers is low, the number of lamination layers required to obtain the desired thickness in the laminate body will need to increase yet weight savings and performance could be maintained.

The prepreg of the present invention preferably has a fiber weight content between 30% and 80% (i.e., the reinforcing fiber represents from 30% to 80% by weight of the prepreg), more preferably between 40% and 70%, and most preferably between 50% and 65%. If the fiber weight content is too low, there is a possibility that the amount of matrix resin will be too high, and the advantages of a fiber-reinforced composite material with excellent specific strength and specific modulus will not be achieved. If the fiber weight content is too high, improper impregnation could occur due to insufficient resin, and there is a possibility that a large number of voids will form in the fiber-reinforced composite material obtained using the prepreg.

Furthermore, the laminate body of the present invention may have one or more permeable pathways created by partially impregnating a thermosetting resin composition (component (B)) into a matrix of reinforcing fiber (component (A)) to provide a prepreg that is then used to form the laminate body. Permeability can be described as the state of a material (the laminate body) that causes it to allow gases (air) to pass through it. The laminate body of the present invention may have, and preferably does have, (prior to being cured) an in-plane permeability parameter below 3.0E-14 m$^2$, wherein the void ratio of said laminate body after cure is <1%. Preferably, the laminate body prior to being cured has an in-plane permeability parameter of at least 1.0E-14 m$^2$. Thus, in certain embodiments, a prepreg in accordance with the present invention provides an uncured laminate body having an in-plane permeability parameter of from 1.0E-14 m$^2$ to 3.0E-14 m$^2$. If the permeability of the prepreg used to prepare the laminate body is too low, complete extraction of entrapped air and or volatiles during debulking and complete consolidation process during cure may not be achieved, leading to poor part quality and increased process times and therefore inefficient manufacturing methods. If permeability remains too high, insufficient consolidation of the laminate body could occur due to the resin flow not being adequate enough to completely wet out the fiber bed during cure, causing poor part quality and leading to inefficient manufacturing methods.

In certain embodiments of the present invention, the average thickness of an uncured laminate body (i.e., uncured prepreg stack) which is assembled by laying up multiple plies of a prepreg in accordance with the invention (in particularly, a prepreg which is relatively thin, e.g., a prepreg which when laid up into a 10 ply stack provides an uncured laminate body having an average thickness of from about 0.02 inches to about 0.04 inches or a prepreg containing a matrix of reinforcing fiber having a fiber areal weight of from about 10 g/m$^2$ to about 100 g/m$^2$) is similar to the average thickness of the laminate body after it has been cured to form a fiber-reinforced composite material. This is believed to be due to the fact that such a prepreg is essentially fully impregnated with the uncured resin matrix (component (B)+component (C), sometimes referred to herein as the "thermosetting resin composition") (near net thickness) and exhibits minimal resin flow (resin loss) during cure. That is, the change in the overall thickness of the laminate body between the uncured state and the cured state is relatively small. Accordingly, the values of X and Y change very little upon curing of the laminate body. The values of X and Y in an uncured laminate body may be measured in accordance with the following procedure: Eight plies of unidirectional prepreg in a [0°] structure are used to prepare a laminate body 300 mm long and 300 mm wide, which is then debulked. A 25 mm long×25 mm wide sample piece is cut from this uncured laminate body. Then, three photographs are taken using an optical microscope at a magnification of 50× or higher such that the inter-layer X and intra-layer Y are clearly defined within the field of view. From the three photographs, 25 thickness measurements are taken for the inter-layer X and 25 thickness measurements are taken for intra-layer Y. An average inter-layer thickness and an average intra-layer thickness are calculated and used as the inter-layer and intra-layer thicknesses for X and Y.

EXAMPLES

Certain embodiments of the present invention are now described in more detail by way of examples. The measurement of various properties was carried out using the methods described below. Those properties were, unless otherwise noted, measured under environmental conditions comprising a temperature of about 23° C. and a relative humidity of about 50%. The components used in the examples and comparative examples were as follows. Table 1 shows the compositions of components (B) and (C), the properties of the thermosetting resin, and the properties of the prepregs and the cured fiber-reinforced composite materials prepared therefrom.

Reinforcing Fibers

There are no specific limitations or restrictions on the type or types of reinforcing fiber used in the present invention, and a wide range of fibers, including glass fibers, carbon fibers, graphite fibers, aramid fibers, boron fibers, alumina fibers and silicon carbide fibers, may be used. Carbon fiber may provide FRP materials that are particularly lightweight and stiff. Carbon fibers with a tensile modulus of 180 to 800 GPa may be used, for example. If a carbon fiber with a high modulus of 180 to 800 GPa is combined with a thermosetting resin composition to provide a prepreg, a desirable balance of stiffness, strength and impact resistance may be achieved in the cured FRP material prepared from such a prepreg.

There are no specific limitations or restrictions on the form of reinforcing fiber, and fibers with diverse forms may be used, including, for instance, long fibers (drawn in one direction), tow, fabrics, mats, knits, braids, and short fibers (chopped into lengths of less than 10 mm). Here, long fibers mean single fibers or fiber bundles that are effectively continuous for at least 10 mm. Short fibers, on the other hand, are fiber bundles that have been chopped into lengths of less than 10 mm. Fiber configurations in which reinforcing fiber bundles have been aligned in the same direction may be suitable for applications where a high specific strength and specific modulus are required.

Thermosetting Resins

The thermosetting resins useful in the present invention may be defined herein as any resin which is self-curing upon application of heat or which can be cured with a curing agent or a cross-linker compound by means of an externally supplied source of energy (e.g., heat, light, electromagnetic waves such as microwaves, UV, electron beam, or other suitable methods) to form a three dimensional crosslinked network having the required resin modulus. Mixtures or blends of two or more different thermosetting resins may be used. The thermosetting resin(s) may be selected from, but are not limited to, epoxy resins, epoxy novolac resins, ester resins, vinyl ester resins, cyanate ester resins, maleimide resins, bismaleimide resins, bismaleimide-triazine resins, phenolic resins, novolac resins, resorcinolic resins, unsaturated polyester resins, diallylphthalate resins, urea resins, melamine resins, benzoxazine resins, polyurethanes, and mixtures thereof.

From the viewpoint of an exceptional balance of strength, strain, modulus and environmental effect resistance, the use of epoxy resins may be advantageous, including mono-, di-functional, and higher functional (or multifunctional) epoxy resins and mixtures thereof. Multifunctional epoxy resins (epoxy resins containing two or more epoxy functional groups per molecule) are preferably selected as they provide excellent glass transition temperature (Tg), modulus and even high adhesion to a reinforcing fiber. These epoxies are prepared from precursors such as amines (e.g., epoxy resins prepared using diamines and compounds containing at least one amine group and at least one hydroxyl group such as tetraglycidyl diaminodiphenyl methane, triglycidyl-p-aminophenol, triglycidyl-m-aminophenol, triglycidyl aminocresol and tetraglycidyl xylylenediamine and their isomers), phenols (e.g., bisphenol A epoxy resins, bisphenol F epoxy resins, bisphenol S epoxy resins, bisphenol R epoxy resins, phenol-novolac epoxy resins, cresol-novolac epoxy resins and resorcinol epoxy resins), naphthalene epoxy resins, dicyclopentadiene epoxy resins, epoxy resins having a biphenyl skeleton, tris(hydroxyphenyl)methane based epoxies (such as Tactix® 742 epoxies by Huntsman), tetraglycidyl ether of glyoxal phenol novolac, fluorene based epoxies, isocyanate-modified epoxy resins and compounds having a carbon-carbon double bond (e.g., alicyclic epoxy resins). It should be noted that the epoxy resins are not restricted to the examples above. Halogenated epoxy resins prepared by halogenating these epoxy resins may also be used. Furthermore, mixtures of two or more of these epoxy resins, and compounds having one epoxy group or monoepoxy compounds such as glycidylaniline, glycidyl toluidine or other glycidylamines (particularly glycidylaromatic amines) may be employed in the formulation of the thermosetting resin matrix.

Examples of commercially available bisphenol A epoxy resin products include jER® 825, jER® 828, jER®834, jER® 1001, jER® 1002, jER® 1003, jER® 1003F, jER® 1004, jER® 1004AF, jER® 1005F, jER® 1006FS, jER® 1007, jER® 1009, jER® 1010 (which are manufactured by Mitsubishi Chemical Corporation), and EPON® 825 and EPON® 828 (from Momentive). Examples of commercially available brominated bisphenol A epoxy resin products include jER® 505, jER® 5050, jER® 5051, jER® 5054 and jER® 5057 (which are manufactured by Mitsubishi Chemical Corporation). Examples of commercially available hydrogenated bisphenol A epoxy resin products include ST5080, ST4000D, ST4100D and ST5100 (which are manufactured by Nippon Steel Chemical Co., Ltd.).

Examples of commercially available bisphenol F epoxy resin products include jER® 806, jER® 807, jER® 4002P, jER® 4004P, jER® 4007P, jER® 4009P and jER® 4010P (which are manufactured by Mitsubishi Chemical Corporation), and Epotohto® YDF2001, Epotohto® YDF2004 (which are manufactured by Nippon Steel Chemical Co., Ltd.), and Epiclon® 830 (from Dainippon Ink and Chemicals, Inc.). An example of a commercially available tetramethyl-bisphenol F epoxy resin product is YSLV-80XY (manufactured by Nippon Steel Chemical Co., Ltd.).

An example of a bisphenol S epoxy resin is Epiclon® EXA-154 (manufactured by DIC Corporation).

Examples of commercially available tetraglycidyl diaminodiphenyl methane resin products include Sumiepoxy® ELM434 (manufactured by Sumitomo Chemical Co., Ltd.), YH434L (manufactured by Nippon Steel Chemical Co., Ltd.), jER® 604 (manufactured by Mitsubishi Chemical Corporation), and Araldite® MY720, MY721, and MY722 (which are manufactured by Huntsman Advanced Materials). Examples of commercially available triglycidyl aminophenol or triglycidyl aminocresol resin products include Sumiepoxy® ELM100 (manufactured by Sumitomo Chemical Co., Ltd.), Araldite® MY0500, MY0510 and MY0600, MY0610 (which are manufactured by Huntsman Advanced Materials) and jER® 630 (manufactured by Mitsubishi Chemical Corporation). Examples of commercially available tetraglycidyl xylylenediamine products and hydrogenated products thereof include TETRAD-X and TETRAD-C (which are manufactured by Mitsubishi Gas Chemical Company, Inc.).

Examples of commercially available phenol-novolac epoxy resin products include jER® 152 and jER® 154 (which are manufactured by Mitsubishi Chemical Corporation), and Epiclon® N-740, N-770 and N-775 (which are manufactured by DIC Corporation).

Examples of commercially available cresol-novolac epoxy resin products include Epiclon® N-660, N-665, N-670, N-673 and N-695 (which are manufactured by DIC Corporation), and EOCN-1020, EOCN-102S and EOCN-104S (which are manufactured by Nippon Kayaku Co., Ltd.).

An example of a commercially available resorcinol epoxy resin product is Denacol® EX-201 (manufactured by Nagase chemteX Corporation).

Examples of commercially available naphthalene epoxy resin products include HP-4032, HP4032D, HP-4700, HP-4710, HP-4770, HP-5000, EXA-4701, EXA-4750, and EXA-7240 (which are manufactured by DIC Corporation) and MY0816 (which is manufactured by Huntsman).

Examples of commercially available dicyclopentadiene epoxy resin products include Epiclon® HP7200, HP7200L, HP7200H and HP7200HH (which are manufactured by DIC Corporation), Tactix® 558 (manufactured by Huntsman Advanced Material), and XD-1000-1L and XD-1000-2L (which are manufactured by Nippon Kayaku Co., Ltd.).

Examples of commercially available epoxy resin products having a biphenyl skeleton include jER® YX4000H, YX4000 and YL6616 (which are manufactured by Mitsubishi Chemical Corporation), and NC-3000 (manufactured by Nippon Kayaku Co., Ltd.).

Examples of commercially available isocyanate-modified epoxy resin products include AER4152 (manufactured by Asahi Kasei Epoxy Co., Ltd.) and ACR1348 (manufactured by ADEKA Corporation), each of which has an oxazolidone ring.

Suitable epoxy resins may be solid, semi-solid or liquid at room temperature (23° C.). Mixtures of solid, semi-solid and/or liquid epoxy resins may be used.

Other types of suitable epoxy resins include glycidylaniline such as GAN (manufactured by Nippon Kayaku Co., Ltd.), glycidyl toluidine such as GOT (manufactured by Nippon Kayaku Co., Ltd.), and tetraglycidyldiaminodiphenylmethane such as Araldite (registered trademark) MY9655 (manufactured by Huntsman Advanced Materials).

Thermoplastic Particles

Particles of one or more thermoplastics may be employed in the thermosetting resin compositions, together with thermosetting resin(s) and optionally one or more other components such as hardeners. The shape and form of such particles are not particularly limited. For example, the particles may be in powder and/or fiber form. The shape or form of the thermoplastic particles may also be spherical, non-spherical, porous, solid, hollow, needle-shaped, whisker-shaped or flake-shaped.

If thermoplastic resin fibers are used, such fibers can be short fibers or long fibers. For the case of short fibers, a method of using fibers in the same manner as particles as shown in JP02-69566A, or a method of processing in a mat is possible. For the case of long fibers, a method of orienting the long fibers horizontally on the surface of the prepreg as shown in JP04-292634A, or a method of randomly orienting the fibers as shown in WO94016003A can be used. Furthermore, the fibers can be processed and used as a sheet type substrate such as a weave as shown in JP02-32843A, or as a nonwoven material or knit as shown in WO94016003A. Furthermore, a method can be used where short fiber chips, chopped strands, milled fibers, and short fibers are spun as thread and then horizontally or randomly oriented to form a weave or knit.

The thermoplastic particles should be selected such that they are not dissolved in the thermosetting resin(s) at 25° C., but rather remain as discrete particles when combined with the other components of the thermosetting resin composition (uncured resin matrix) used to impregnate a fiber layer to form a prepreg. In addition to one or more thermoplastic resins, the particles may be comprised of one or more additional components, including any of the additives typically employed in thermoplastics such as fillers, stabilizers and the like.

Preferably, the particle size of the thermoplastic particles is within the range of about 5 microns to 50 microns. In particular, a particle size distribution of the thermoplastic particles may be measured by a laser diffraction scattering method and a cumulative curve determined with the total volume as 100%, wherein a particle diameter of the thermoplastic particles having a cumulative curve of 90% is between 5 and 20 microns. Herein, the particle diameter refers to the particle diameter at each volume % on a cumulative curve where the total volume is 100%, when the particle size distribution is measured by a laser diffraction scattering method. The particle size distribution that is used in the present invention is measured by the laser diffraction scattering method using an LMS-24 manufactured by Seishin Enterprise Co., Ltd. The particle diameter is determined at 50 volume % (median diameter) and 90 volume % on the cumulative curve of the particle size distribution obtained.

The thermoplastic resin of the thermoplastic particles can be crystalline or amorphous. In particular, at least one type of thermoplastic resin is used to form the thermoplastic particles which is selected from the group consisting of polyamides, polycarbonates, polyacetals, polyphenylene oxides, polyphenylene sulfides, polyarylates, polyesters, polyamideimides, polyimides, polyetherimides, polyimides with a phenyltrimethylindane structure, polysulfones, polyethersulfones, polyetherketones, polyetheretherketones, polyaramids, polyethernitriles, and polybenzimidazoles. Polyamide particles are particularly preferred for use in the present invention. Among the polyamides, nylon 12, nylon 11, nylon 6, nylon 6/12 copolymer, and a nylon (semi-IPN nylon) modified to have a semi-IPN (interpenetrating polymer network) with an epoxy compound as disclosed in Example 1 of Japanese Patent Application Laid-open No. 1-104624 impart particularly good adhesive strength in combination with the epoxy resin, and nylon 6/12 copolymers impart particularly favorable adhesion strength to the thermosetting resin composition.

The amount of thermoplastic particles is preferably 20 weight % or less with regards to the total weight of the prepreg sheet and/or is preferably 1 weight % or more with regards to the total weight of the prepreg sheet.

Soluble Thermoplastic Resins

According to certain aspects of the invention, the thermosetting resin composition may comprise, in addition to at least one thermosetting resin and thermoplastic particles, at least one thermoplastic resin blended into and dissolved in the thermosetting resin (hereinafter sometimes referred to as a "soluble thermoplastic resin"), in order to provide improved effects such as enhancing the toughness of the matrix resin when cured and at the same time controlling the viscosity of the thermosetting resin composition. Furthermore, the soluble thermoplastic resin can be crystalline or amorphous. In particular, at least one type of soluble thermoplastic resin is used which is selected from the group consisting of polyamides, polycarbonates, polyacetals, polyphenylene oxides, polyphenylene sulfides, polyarylates, polyesters, polyamideimides, polyimides, polyetherimides, polyimides with a phenyltrimethylindane structure, polysulfones, polyethersulfones, polyetherketones, polyetheretherketones, polyaramids, polyethernitriles, and polybenzimidazoles. These soluble thermoplastic resins can be commercial polymers, or so-called oligomers with a lower molecular weight than commercial polymers.

A soluble thermoplastic resin having a number average molecular weight of 10,000 to 70,000 g/mol is preferably used and most preferably a soluble thermoplastic resin having a number average molecular weight of 20,000 to 60,000 g/mol is used. When a thermoplastic resin having a number average molecular weight within the preferred range is used and dissolved in a thermosetting resin, a large amount of the soluble thermoplastic resin can be incorporated as long as the prepreg process is not compromised. As a result, good resin flow, high toughness, and high tensile strength can be achieved in the cured fiber-reinforced composite material obtained therefrom.

Furthermore, the formulation amount of these soluble thermoplastic resins in the thermosetting resin composition is preferably between 5 and 30 weight parts, more preferably between 10 and 25 weight parts, and most preferably between 10 and 23 weight parts, per 100 weight parts of thermosetting resin (e.g., epoxy resin). If the formulation amount of thermoplastic resin is too low, there is a possibility that toughness could be lost. If the formulation amount of the thermoplastic resin is too high, toughness could be improved although processability could potentially be lost due to the significant increase in resin viscosity causing extreme processing conditions.

Suitable soluble thermoplastic resins include, for example, polyethersulfone with a terminal hydroxyl group, such as "Sumikaexcel (registered trademark)" PES5003P (manufactured by Sumitomo Chemical Co., Ltd.) having a number average molecular weight of 47,000 g/mol.

The following methods were used to characterize the thermosetting resin composition and the prepreg for each working example.

(1) Thermosetting Resin Composition Viscosity Measurement

A mixture was created by dissolving prescribed amounts of all the components other than the curing agent in a mixer, and then prescribed amounts of the curing agent were mixed into the mixture to obtain the thermosetting resin composition. Viscosity at 40° C. and the minimum viscosity are determined by the following methods.

The viscosity of the thermosetting resin composition was measured using a dynamic viscoelasticity measuring device (ARES, manufactured by TA Instruments) using parallel plates while increasing the temperature at a rate of 2° C./min, with a strain of 10%, frequency of 0.5 Hz, and plate gap of 1 mm, and plate dimensions of 40 mm, from 30° C. to 170° C. In the present invention, viscosity refers to the complex viscoelastic modulus. Minimum viscosity can be calculated from a correlation curve of the temperature and the viscosity under the condition of rate of temperature increase at 2° C./min, a vibration frequency of 0.5 Hz, and a parallel plate (diameter 40 mm). Viscosity at 30° C. (referred to as initial viscosity) and minimum viscosity (referred to as highest resin flow point→most liquid state) can be obtained by the curve generated from the ARES device plot using the same parameters.

(2) Fiber-Reinforced Composite Material Void Ratio Measurement

A cured composite article consisting of eight plies of unidirectional prepreg in a [0°] structure with a laminate body 300 mm long and 300 mm wide was prepared. Three 25 mm long×25 mm wide sample pieces were cut from this laminate body, and the cross-section was polished, and then three photographs were taken of each piece for a total of nine photographs using an optical microscope at a zoom of 50× or higher such that the top and bottom surfaces of the laminate body fit within the viewing field. The surface area ratio of voids with regards to the cross-sectional area was calculated and the average void ratio was used as the void ratio.

Figure 3:
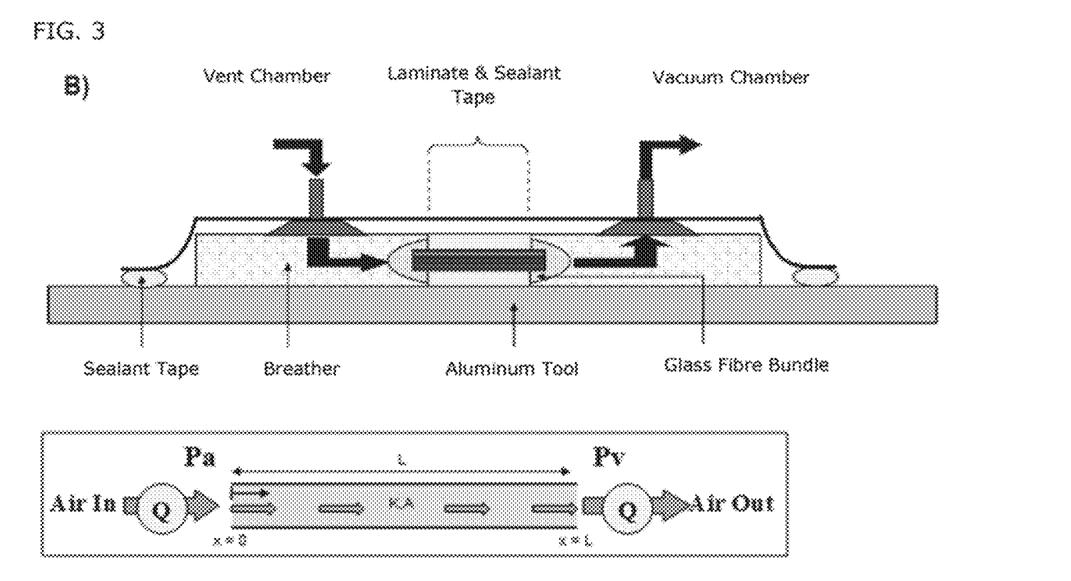
FIG. 3 is a schematic of the in-plane permeability test, which is described in more detail in the Examples.

(3) The following procedure is employed to measure the in-plane permeability of laminate bodies prepared using a plurality of prepregs. The permeability test measurement was performed in accordance with the procedures described in pages 36-48 of the master's thesis of Kevin Hsiao entitled "Gas Transport and Water Vapourization in Out-of-Autoclave Prepreg Laminates" (University of British Columbia 2012). Gas permeability in the in-plane and through-thickness directions was measured and the effects of processing conditions such as out time, storage, and vacuum conditioning times were documented. First, 4-10 plies of uni-directional prepreg were cut with a dimension of approximately 50 mm (w)×300 mm (1). Based on the desired nominal thickness (approximately 0.03 inches (0.7 mm)), plies were then laid up and consolidated at room temperature (ca. 23° C.) under vacuum at a level of about 95 kPa. Each sample was laid up such that two breathing edges remain exposed in the in-plane testing direction as shown in FIG. 3. The exposed edges were covered by glass fiber bundles and placed in contact with layers of breather and vacuum ports to form complete pathways for gas (air) removal and monitoring. The permeability tester was then checked for leaks. Thereafter, the test was initiated and, once steady-state flow was achieved, flow rate data was recorded at desired time intervals.

The test measures Q through the laminate stack and permeability K is calculated by Darcy's Steady State flow:

$$Q = \frac{AK}{2\mu L}\left(\frac{p_0^2 - p_L^2}{p_0}\right)$$

Where:
K [m$^2$] is Permeability
Q [m$^3$/s] is steady-state volumetric flow rate
μ [Pa*s] is the dynamic viscosity of air at room temperature
L [m] is sample length
A [m$^2$] is cross-sectional area
P$_O$ [Pa] is pressure in
P$_L$ [Pa] is pressure out (4) The following procedure is used to measure the thicknesses X and Y in a fiber-reinforced composite material obtained by laying up prepregs to provide a laminate body and curing the laminate body:

A cured composite article consisting of 8 plies of unidirectional prepreg in a [0°] structure with a laminate body 300 mm long and 300 mm wide is prepared. A 25 mm long×25 mm wide sample piece is cut from this cured laminate body and the cross-section is polished. Then, three photographs are taken using an optical microscope at a magnification of 50× or higher such that the inter-layer X and intra-layer Y are clearly defined within the field of view. From the three photographs, 25 thickness measurements are taken for the inter-layer X and 25 thickness measurements are taken for intra-layer Y. An average inter-layer thickness and an average intra-layer thickness are calculated and used as the inter-layer and intra-layer thicknesses for X and Y.

(5) Compression after Impact (CAI)

A unidirectional prepreg is quasi-isotropically overlaid in a [+45° I 0° I −45° I 90°] configuration to achieve a nominal thickness of about 0.18". The prepreg stack is then molded using a vacuum bag only process by placing it into a vacuum envelope and degassing for three hours at room temperature with a degree of vacuum of about 100 kPa. After degassing is complete, the laminate body is brought from room temperature to 120° C. at a rate of 1.7° C./min and held at 120° C. for 240 minutes and then finally cured at a rate of 1.7C/min to 180° C. for 120 minutes to provide a fiber-reinforced composite material. A sample with a length of 150 mm and a width of 100 mm is cut from this laminate body, and the compressive strength after impact is determined by providing a falling weight impact of 6.7 J/mm on the center of the sample in accordance with SACMA SRM 2R-94.

Working Examples 1-2 and 4-7 and Comparative Examples 1-2

13 weight parts of PES5003P polyethersulfone were added and dissolved in 60 weight parts of Araldite (registered trademark) MY9655 and 40 weight parts of EPc830 (registered trademark) in a kneader, 45 weight parts of Aradur (registered trademark) 9664-1 were kneaded in as a hardener, and then 20 weight parts of fine particles (Component (C)) were added to produce a thermosetting resin composition (Component (B). Comparative Example 2 followed same procedure as with Working Examples 1-2 and 4-7 and Comparative Example 1, but excluding the fine particles (Component (C)).

The produced thermosetting resin composition (Component (B), in combination with Component (C) in certain of the examples) was applied onto release paper using a knife coater to produce two sheets of resin film having a weight of between about 20-30 g/m². Next, the aforementioned two sheets of fabricated resin film were overlaid on both sides of unidirectional oriented carbon fibers with a density of 1.8 g/cm³ in the form of a sheet (T1100; Component (A)) and the resin was impregnated into the sheet of carbon fibers using a roller temperature of 130° C. and a roller pressure of 0.20 MPa to produce a unidirectional prepreg with a carbon fiber area weight of 70 g/m² and a matrix resin weight fraction between 33-48%.

A laminate body (precursor to a fiber-reinforced composite material) was fabricated by laying up 8 plies of the aforementioned prepreg and molded using a vacuum bag only process as defined below by placing it into a vacuum envelope and degassing for three hours at room temperature with a degree of vacuum of about 100 kPa. After degassing was complete the laminate body was brought from room temperature to 120° C. at a rate of 1.7C/min and held at 120° C. for 240 minutes and then finally cured at a rate of 1.7C/min to 180° C. for 120 minutes to provide a fiber-reinforced composite material.

In comparison to Comparative Examples 1 and 2, with comparable in-plane permeability levels below 3.0E-14 m² yet increasing the resin content between 36% to 48% and having a thickness ratio 2X/Y between the inter-layer and intra-layer of 0.6 to 1.0 a void content <1% for out of autoclave processing is achieved while still maintaining good mechanical performance of Compression After Impact (CAI). In the case of Comparative Example 2 without fine particles Component (C), void content of <1% is achieved yet mechanical performance of CAI is lost and in addition viscosity levels are too low to produce a semi-impregnated prepreg suitable for OOA processing. Furthermore, Working Example 2 utilizes a different interlayer toughening particle (PA2) with same loading and yet shows comparable in-plane permeability while achieving <1% void and good mechanical performance.

Working Example 3 and Comparative Examples 1-2

18 weight parts of PES5003P polyethersulfone were added and dissolved to increase resin viscosity in 60 weight parts of Araldite (registered trademark) MY9655 and 40 weight parts of EPc830 (registered trademark) in a kneader, 45 weight parts of Aradur (registered trademark) 9664-1 were kneaded in as a hardener, and then 20 weight parts of fine particles (Component (C)) were added to produce a thermosetting resin composition (Component (B). In comparison to Comparative Examples 1 and 2, increasing the resin viscosity, increasing the resin content to 36% and having a thickness ratio (2X/Y) between the inter-layer and intra-layer thicknesses of 0.6 to 1.0 achieves a void content <1% for out of autoclave processing while still maintaining good mechanical performance of CAI.

Working Example 8 and Comparative Example 3

Prepregs and laminate bodies were fabricated in a similar manner to Working Examples 1-2 and 4-7 except that matrix of reinforcing fiber used to prepare the prepregs had a fiber areal weight of 90 g/m². In comparison to Comparative Example 3, increasing the resin content to 40% and having a thickness ratio (2X/Y) between the inter-layer and intra-layer thicknesses of 0.6 to 1.0 achieves a void content <1% for out of autoclave processing while still maintaining good mechanical performance of CAI.

Working Examples 9-10 and Comparative Examples 4-5

Prepregs and laminate bodies were fabricated in a similar manner to Working Examples 1-2 and 4-7 except the fiber type used was a T800 having fiber areal weights of 150 g/m² and 190 g/m². In comparison to Comparative Examples 4 and 5, increasing the resin content to 40% and having a thickness ratio (2X/Y) between the inter-layer and intra-layer thicknesses of 0.6 to 1.0 achieves a void content <1% for out of autoclave processing while still maintaining good mechanical performance of CAI. Although similar improvement was seen for Working Examples 9 and 10, the increase in resin content results in an undesirable weight penalty for the prepreg.

Working Example 11 and Comparative Example 6

Prepregs and laminate bodies were fabricated in a similar manner to Working Examples 1-2 and 4-7 except the fiber type used was a T800 having a fiber areal weight of 301 g/m². In comparison to Comparative Example 6, increasing the resin content to 42% and having a thickness ratio (2X/Y) between the inter-layer and intra-layer thicknesses of 0.6 to 1.0 achieves a void content <1% for out of autoclave processing while still maintaining good mechanical performance of CAI. Although similar improvement was seen for Working Example 11, the increase in resin content results in an undesirable weight penalty for the prepreg and an increase in thickness.

TABLE 1

| | | | | Unit | C. E 1 | C. E 2 | C. E 3 | C. E 4 | C. E 5 | C. E 6 | EX 1 | EX 2 |
|---|---|---|---|---|---|---|---|---|---|---|---|---|
| Thermosetting resin (Component B) | Epoxy | MY9655 | (Weight Parts) | | 60 | 60 | 60 | 60 | 60 | 60 | 60 | 60 |
| | | EPc830 | | | 40 | 40 | 40 | 40 | 40 | 40 | 40 | 40 |
| | Curative | Aradur® 9664-1 (4-4'DDS) | | | 45 | 45 | 45 | 45 | 45 | 45 | 45 | 45 |
| | Additive | PES5003P | | | 13 | 13 | 13 | 13 | 13 | 13 | 13 | 13 |
| Thermoplastic particle (Component C) | Interlayer toughening material | PA 1 | | | 20 | 0 | 20 | 20 | 20 | 20 | 20 | 0 |
| | | PA 2 | | | 0 | 0 | 0 | 0 | 0 | 0 | 0 | 20 |
| Epoxy Resin Properties | Thermosetting resin viscosity at 40° C. | | (Pa·s) | | 5581 | 1621 | 5581 | 5581 | 5581 | 5581 | 5581 | 6900 |
| | Minimum viscosity of thermosetting resin | | (Pa·s) | | 2.0 | 0.5 | 2.0 | 2.0 | 2.0 | 2.0 | 2.0 | 3.0 |
| Fiber Reinforced Composite Material Properties | Resin content | | (wt %) | | 33 | 33 | 34 | 34 | 34 | 36 | 36 | 36 |
| | Fiber areal weight | | (g/m²) | | 70 | 70 | 90 | 150 | 190 | 301 | 70 | 70 |
| | Reinforcing Fiber (Component A) | | Type | | T1100 | T1100 | T1100 | T800 | T800 | T800 | T1100 | T1100 |
| | In-plane Air Permeability | | (m²) | | 2.3E−14 | 1.0E−14 | 3.0E−14 | 2.5E−14 | 3.0E−14 | 6.0E−14 | 2.5E−14 | 2.1E−14 |
| | Inter-laminar thickness [X] | | (μm) | | 11 | 5 | 14 | 19 | 28 | 28 | 13 | 13 |
| | Intra-laminar thickness [Y] | | (μm) | | 40 | 36 | 55 | 130 | 160 | 210 | 40 | 41 |
| | 2X/Y ratio | | (%) | | 0.55 | 0.28 | 0.51 | 0.29 | 0.35 | 0.27 | 0.65 | 0.63 |
| | Void Ratio | | (%) | | 1.8 | 0.1 | 1.2 | 1.7 | 2.3 | 2.7 | 0.5 | 0.6 |
| | Compression After Impact (CAI) [Poor <29 : Fair 30-35 : Good >36] | | (ksi) | | Poor | Poor | Fair | Fair | Fair | Poor | Good | Good |

| | | | | Unit | EX 3 | EX 4 | EX 5 | EX 6 | EX 7 | EX 8 | EX 9 | EX 10 | EX 11 |
|---|---|---|---|---|---|---|---|---|---|---|---|---|---|
| Thermosetting resin (Component B) | Epoxy | MY9655 | (Weight Parts) | | 60 | 60 | 60 | 60 | 60 | 60 | 60 | 60 | 60 |
| | | EPc830 | | | 40 | 40 | 40 | 40 | 40 | 40 | 40 | 40 | 40 |
| | Curative | Aradur® 9664-1 (4-4'DDS) | | | 45 | 45 | 45 | 45 | 45 | 45 | 45 | 45 | 45 |
| | Additive | PES5003P | | | 18 | 13 | 13 | 13 | 13 | 13 | 13 | 13 | 13 |
| Thermoplastic particle (Component C) | Interlayer toughening material | PA 1 | | | 20 | 20 | 20 | 20 | 20 | 20 | 20 | 20 | 20 |
| | | PA 2 | | | 0 | 0 | 0 | 0 | 0 | 0 | 0 | 0 | 0 |
| Epoxy Resin Properties | Thermosetting resin viscosity at 40° C. | | (Pa·s) | | 8677 | 5581 | 5581 | 5581 | 5581 | 5581 | 5581 | 5581 | 5581 |
| | Minimum viscosity of thermosetting resin | | (Pa·s) | | 3.0 | 2.0 | 2.0 | 2.0 | 2.0 | 2.0 | 2.0 | 2.0 | 2.0 |
| Fiber Reinforced Composite Material Properties | Resin content | | (wt %) | | 36 | 38 | 40 | 45 | 48 | 40 | 40 | 40 | 42 |
| | Fiber areal weight | | (g/m²) | | 70 | 70 | 70 | 70 | 70 | 90 | 150 | 190 | 301 |
| | Reinforcing Fiber (Component A) | | Type | | T1100 | T1100 | T1100 | T1100 | T1100 | T1100 | T800 | T800 | T800 |
| | In-plane Air Permeability | | (m²) | | 2.7E−14 | 2.3E−14 | 2.0E−14 | 2.0E−14 | 1.9E−14 | 2.6E−14 | 2.5E−14 | 3.0E−14 | 3.0E−14 |
| | Inter-laminar thickness [X] | | (μm) | | 14 | 14 | 15 | 19 | 20 | 17 | 40 | 51 | 63 |
| | Intra-laminar thickness [Y] | | (μm) | | 41 | 40 | 40 | 41 | 41 | 55 | 130 | 160 | 210 |
| | 2X/Y ratio | | (%) | | 0.68 | 0.70 | 0.75 | 0.93 | 0.98 | 0.62 | 0.62 | 0.64 | 0.60 |
| | Void Ratio | | (%) | | 0.6 | 0.2 | 0.1 | 0.1 | 0.2 | 0.5 | 0.4 | 0.5 | 0.7 |
| | Compression After Impact (CAI) [Poor <29 : Fair 30-35 : Good >36] | | (ksi) | | Good | Good | Good | Good | Good | Good | Good | Good | Good |

What is claimed is:

1. A laminate body comprised of a plurality of prepregs, wherein each prepreg is comprised of a component (A) comprising a matrix of reinforcing fiber, a component (B) comprising a thermosetting resin, and a component (C) comprising a plurality of particles of a thermoplastic resin, wherein:

i) the matrix of reinforcing fiber of each prepreg has a fiber areal weight of between about 10 gsm and about 100 gsm and is impregnated by component (B), ii) component (B) represents from about 36% to about 48% of the total weight of each prepreg;

iii) the laminate body before out of autoclave cure has an in-plane permeability which is lower than 3.0E−14 m² and after out of autoclave cure has a) an inter-laminar thickness and an intra-laminar thickness satisfying the ratio: 0.6<2X/Y<1.0, wherein X is the inter-laminar thickness and wherein Y is the intra-laminar thickness, and b) a void ratio of <1%; and iv) each prepreg is a unidirectional prepreg.

2. The laminate body according to claim 1, wherein the plurality of particles of a thermoplastic resin has a particle size distribution as measured by a laser diffraction scattering method such that when a cumulative curve is determined with the total volume as 100%, a particle diameter of the particles having a cumulative curve of 90% is between about 5 μm and about 20 μm.

3. The laminate body according to claim 2, wherein the particles of thermoplastic resin of component (C) are present in an amount of about 6 wt % to about 20 wt % based on the weight of the thermosetting resin.

4. The laminate body according to claim 3, wherein components (B) and (C) when cured provide a cured resin matrix having a glass transition temperature above 150° C.

5. The laminate body according to claim 1, wherein component (B) has a viscosity at 40° C. of between about 100 and about 10000 Pa·s and a minimum viscosity of between about 0.1 and about 15 Pa·s.

6. The laminate body according to claim 1, wherein component (B) is additionally comprised of at least one thermoplastic resin, dissolved in the thermosetting resin, which is selected from the group consisting of polyvinyl formals, polyamides, polycarbonates, polyacetals, polyvinylacetals, polyphenyleneoxides, polyphenylenesulfides, polyarylates, polyesters, polyamideimides, polyimides, polyetherimides, polysulfones, polyethersulfones, polyetherketones, polyetheretherketones, polyaramids, polyethernitriles, polybenzimidazoles, derivatives thereof, and combinations thereof.

7. The laminate body according to claim 6, wherein the thermoplastic resin dissolved in the thermosetting resin of component (B) is present in component (B) in an amount which is 5-30 weight parts per 100 weight parts of the thermosetting resin.

8. The laminate body according to claim 1, wherein the component (C) is substantially locally distributed on or near a surface of the prepreg.

9. The laminate body according to claim 1, wherein the prepreg comprises a first layer comprised of a portion of the thermosetting resin and a second layer comprised of the matrix of reinforcing fiber.

10. The laminate body according to claim 1, wherein both sides of the prepreg are covered substantially by component (B).

11. A fiber-reinforced composite material comprising at least one laminate body in accordance with claim 1, wherein the laminate body has been thermally cured.

12. The fiber-reinforced composite material of claim 11, wherein after a cure cycle, the void ratio is <1%.

13. A method for manufacturing a fiber-reinforced composite material, comprising molding the laminate body of claim 1 using a vacuum pump and oven.

14. A laminate comprising a prepreg, wherein the prepreg is comprised of:

a component (A) comprising a matrix of reinforcing fiber;
a component (B) comprising a thermosetting resin; and
a component (C) comprising a plurality of particles of thermoplastic resin;

wherein:
i) the matrix of reinforcing fiber has a fiber areal weight of between about 10 gsm and about 100 gsm and is impregnated by component (B);
ii) component (B) represents from about 36% to about 48% of the total weight of the prepreg;
iii) the laminate body before out of autoclave cure has an in-plane permeability lower than 3.0E-14 m² and after out of autoclave cure has an inter-laminar thickness and an intra-laminar thickness satisfying the ratio: 0.6<2X/Y<1.0, wherein X is the inter-laminar thickness and Y is the intra-laminar thickness; and
iv) each prepreg is a unidirectional prepreg.

15. A process for making a laminate body, comprising:
i) making a prepreg comprising impregnating a component (A) comprising a matrix of reinforcing fiber having a fiber areal weight of between about 10 gsm to about 100 gsm with a component (B) comprising a thermosetting resin in combination with a component (C) comprising a plurality of particles of thermoplastic resin to form the prepreg, wherein
component (B) represents from about 36% to about 48% of the total weight of the prepreg and wherein the prepreg is a unidirectional prepreg;
ii) laying up a plurality of plies of prepreg to obtain a laminate body, wherein the laminate body before out of autoclave cure has an in-plane permeability which is lower than 3.0E-14 m² and after out of autoclave cure has: a) an inter-laminar thickness and an intra-laminar thickness satisfying the ratio: 0.6<2X/Y<1.0, wherein X is the inter-laminar thickness and Y is the intra-laminar thickness, and b) a void ratio of <1%.

16. A process for making a fiber-reinforced composite material, comprising the steps of: a) laying up a plurality of plies of prepreg to obtain a laminate body having an in-plane permeability which is lower than 3.0E-14 m²; and b) curing the laminate body to obtain the fiber-reinforced composite material; wherein:
i) the prepreg comprises a component (A) comprising a matrix of reinforcing fiber having a fiber areal weight of between about 10 gsm and about 100 gsm, a component (B) comprising a thermosetting resin and representing from about 36% to about 48% of the total weight of the prepreg, and a component (C) comprising a plurality of particles of thermoplastic resin;
ii) the matrix of reinforcing fiber is impregnated by component (B) in combination with component (C); and
iii) the fiber-reinforced composite material has a) an inter-laminar thickness and an intra-laminar thickness satisfying the ratio: 0.6<2X/Y<1.0, wherein X is the inter-laminar thickness and Y is the intra-laminar thickness, and b) a void ratio of <1%; and
iv) each prepreg is a unidirectional prepreg.

\* \* \* \* \*